March 2, 1943. M. BECHIK 2,312,379
ANCHORING DEVICE FOR APPLICATION TO MATTRESS WALLS
Filed Dec. 3, 1941
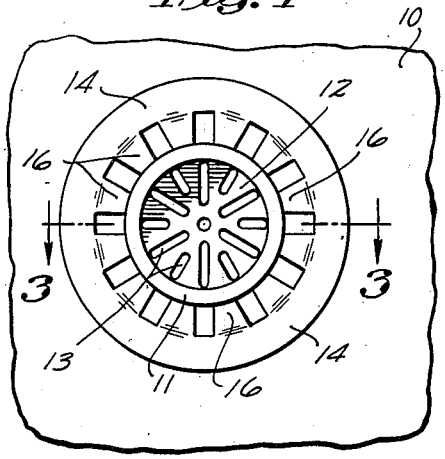
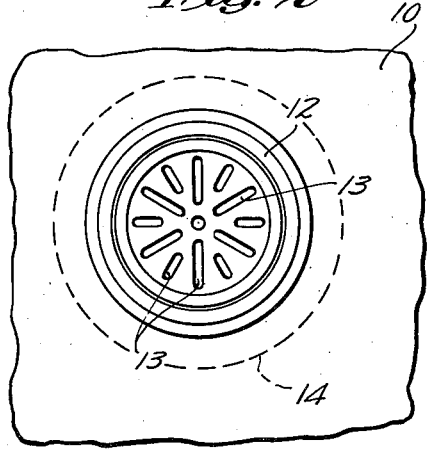
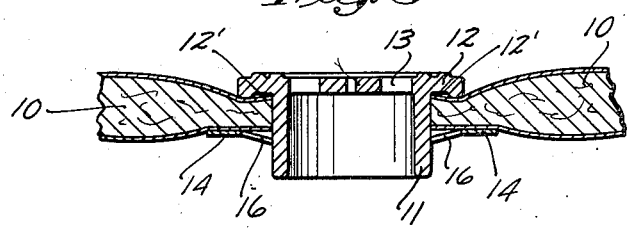
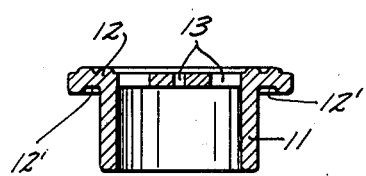
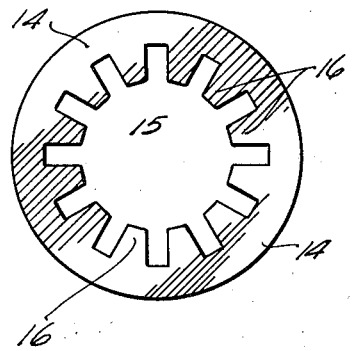
Inventor
Michael Bechik
By his Attorneys Patented Mar. 2, 1943

2,312,379

UNITED STATES PATENT OFFICE 2,312,379

ANCHORING DEVICE FOR APPLICATION TO MATTRESS WALLS

Michael Bechik, St. Paul, Minn.

Application December 3, 1941, Serial No. 421,455

2 Claims. (Cl. 5—347)

My present invention relates to the mattress art and provides a simple and highly efficient anchoring device which, when applied, to a mattress wall, will be securely anchored thereto and will serve to anchor to the wall cylindrical or approximately cylindrical shanks such as found on rivets, bolts and the like.

The element of this attachment is in the nature of a washer and is adapted to be made or stamped from a sheet of resilient metal such as sheet steel, and which washer is formed with a central or axial passage and resilient lock prongs circumferentially distributed around and directed radially toward the axis of the said passage. In this arrangement the lock prongs will frictionally engage and bite against the entire or substantially the entire peripheral surface of a shank, bolt or rivet forced through the axial passage. This circumferential distribution of the lock prongs is of especially high importance when the washer is to be applied to a smooth cylindrical surface of a shank forced through the axial passage. When such a shank, which is of somewhat greater diameter than the axial passage, is forced through the washer, the resilient prongs thereof will be pressed into planes oblique to the body of the washer and they will then exert a frictional biting action against the shank that will be evenly distributed around the shank and all thereof will exert pressure directly toward the axis of the passage and of the shank. The shank itself may be an individual member or may be a part only of a device that is to be attached to the mattress wall.

The term "shank" is herein used in a broad and liberal sense to include devices such as those referred to above.

In the present illustration of the invention shown in the drawings, the attachment is in the nature of a ventilating device including a tubular shank and the lock washer of the improved form above indicated. The shank is provided at its outer end with an outstanding clamping flange which is preferably designed to give an ornamental appearance having much the appearance of a button. The exterior of the shank is, as stated, of considerably greater diameter than the axial passage in the lock washer.

A commercial form of the device or attachment is illustrated in the accompanying drawing wherein like characters indicate like parts throughout the several views.

Referring to the drawing:

Fig. 1 is an elevation showing a fragment of a mattress wall looking at the applied lock washer in a direction from the interior of the mattress toward the inner surface of the mattress wall;

Fig. 2 is an elevation, similar to Fig 1, but looking at the outer surface of the mattress wall and the flanged outer end of the applied shank;

Fig. 3 is a section taken on the line 3—3 of Fig. 1;

Fig. 4 shows the flanged shank in axial section; and

Fig. 5 is a plan view of the improved lock washer showing the same removed from working position.

The mattress wall is indicated by the numeral 10. The tubular cylindrical shank 11 has the button appearing outer end flange 12 which, as shown, is formed with air passages 13.

The lock washer 14 is formed with an axial passage 15 and with the circumferentially distributed or spaced lock prongs 16, all of which are directed toward the axis of the passage 15. The shank 11 is of considerably greater diameter than said passage 15 so that when the shank is forced through said passage, the lock prongs 16 will be forced into planes oblique to the body of the washer 14 and all of the said prongs will then be operative against the shank to frictionally bite against the surface thereof and effectually lock the washer to said shank and cause the body of the washer 14 to tightly compress the engaged portion of the mattress wall 10 against the flange 12. The reacting force of the compressed portion of the mattress wall will, of course, keep the washer under pressure to maintain engagement of the lock prongs 16 in secure frictional biting engagement with the shank.

From the foregoing it must be evident that the described arrangement of the resilient prongs distributed around the opening as described is important and is especially important when the lock washer is to be applied to a shank that has a smooth cylindrical surface.

To increase the gripping action of the flange 12 on the engaged portion of the mattress wall, it is formed with an annular recess 12' inward of its periphery and just outward of the shank 11.

It is important to note that the perimeter of the clamping washer 14 is of considerably greater diameter than the head or flange 12 of shank 11 so that the stuffing material of the mattress wall 10, through which the shank is inserted, will be engaged on the inner side outward of the inturned peripheral flange 12' of the head 12, and thereby very securely anchor the device or attachment to the mattress wall by allowing the stuffing material around the shank to expand along the shank and thereby prevent it from being squeezed and forced away from the shank by annular clamping pressure exerted on opposite sides of the wall. When the lock washer is tightly pressed against the mattress wall, the engaged portion of the latter outwardly of the shank will be tightly compressed and its reacting force will act upon the circular portion of the washer with a force that will keep the anchoring prongs in constant close engagement with the shank or inserted cylindrical element, by preventing shifting of the wall stuffing.

In practice I have found that the device when thus applied to a mattress wall with the lock washer tightly pressed against the inner surface of the mattress wall, numerous biting contacts between the washer and the shank distributed all around the same will maintain the locking engagement under various normal and rough useage.

In the preferred form of the anchoring device the shank and its flange are preferably made of a molded plastic such, for example, as the material sold to the trade as "tenite" and which material is a synthetic, organic, plastic, the chemical nature of which is more specifically designated as a cellulose acetate butyrate. A shank of this material is not quite as hard as ordinary metal. When the shank is of such material the prongs will have a very certain biting action.

What I claim is:

1. An anchoring attachment for mattress wall ventilators and the like comprising a cylindrical shank having a head at one end thereof and a lock washer engageable with the shank for compressing a mattress wall between same and said head, said head including a circumferential flange having an annular recess therein adjacent said shank and opposed to said washer, and said washer comprising a circular member of substantially greater diameter than said head and having a central passage of less diameter than said shank, said passage being defined by the inner ends of radially disposed resilient locking prongs adapted to be inclined from the plane of said head to bite against the peripheral surface of said shank upon forcing said washer toward said head, whereby to tightly compress the material of a mattress wall between the circular portion of said washer and the circumferential flange of said head spaced from the shank thereof.

2. In a mattress wall, a ventilator member having a tubular shank and a perforated head in communication with the interior of the shank, said head including a circumferential mattress wall engaging flange having a recess in the under face thereof adjacent the shank, and a lock washer having a deformable inner apertured portion of less diameter than the tubular shank frictionally engageable over the shank in inclined opposed relation to the recessed face of the head flange, and said washer having an outer portion engageable with the mattress wall in opposed relation to the head to tightly compress the material of the wall against the head outwardly of the tubular shank.

MICHAEL BECHIK.